UNITED STATES PATENT OFFICE.

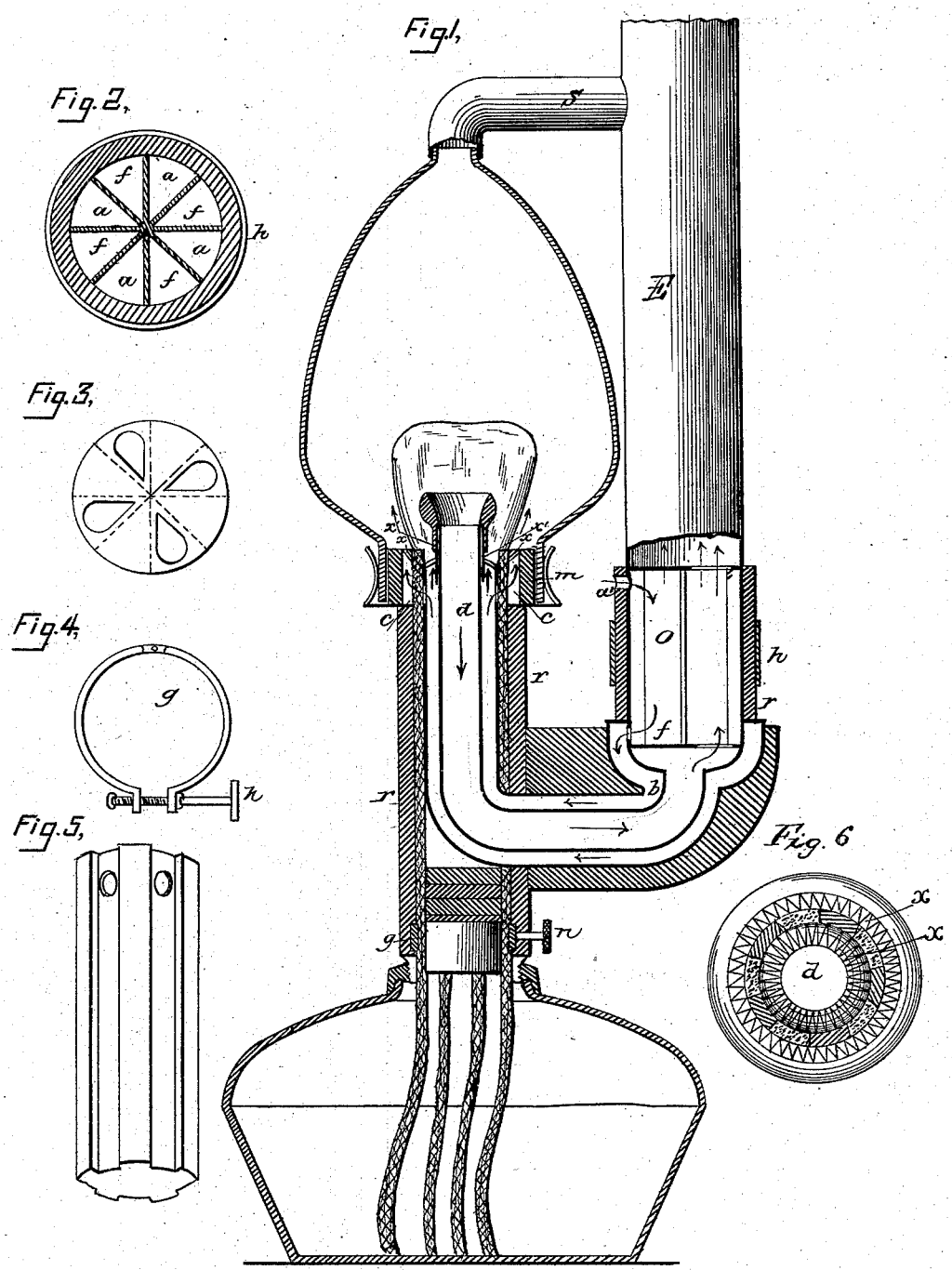

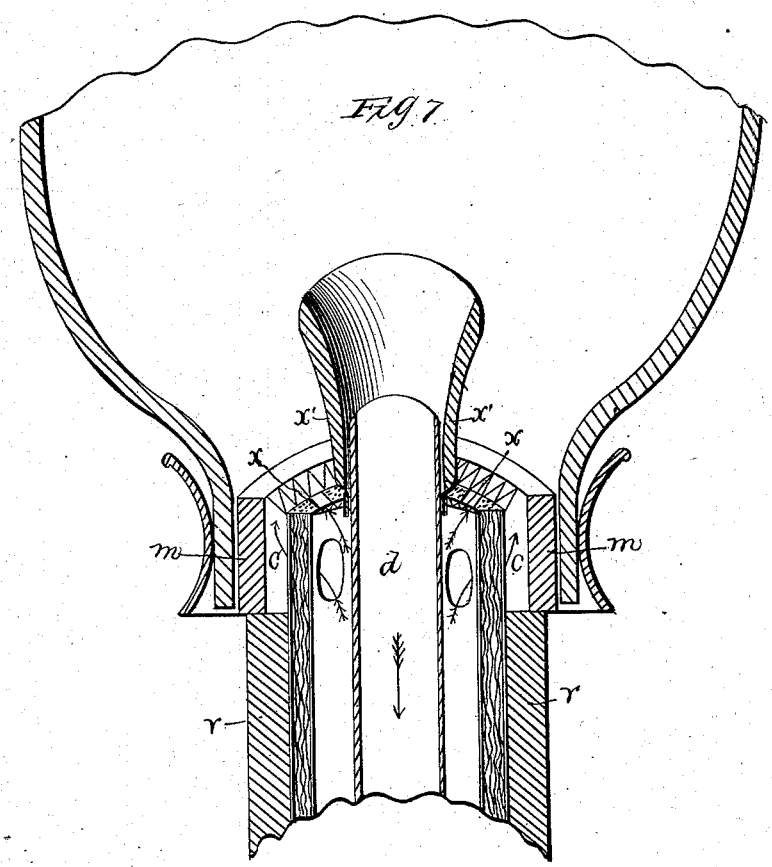

CHARLES H. MURRAY, OF LEADVILLE, COLORADO.

HOT-AIR OIL-LAMP.

SPECIFICATION forming part of Letters Patent No. 295,666, dated March 25, 1884.

Application filed November 24, 1882. (No model.)

*To all whom it may concern:*

Be it known that I, CHARLES HAMMOND MURRAY, a citizen of the United States, residing at Leadville, in the county of Lake and State of Colorado, have invented a new and useful form of Illuminating-Lamp entitled a "Hot-Air Oil-Lamp," of which the following is a specification.

This invention relates to an improvement in burning petroleum or other oils for lighting purposes; and it consists in the combination and the arrangement of devices, substantially as hereinafter more fully set forth and claimed.

The character and construction of the lamp are shown in the accompanying drawings, of which Figure 1 is a transverse vertical section of the lamp and the preheater, showing their connections and internal construction. Fig. 2 is a cross-section of the preheater, indicating its divisions. Fig. 3 is an end view of the preheater, showing the apertures for the ingress and egress of the products of combustion. Fig. 4 represents the throttle-ring. Fig. 5 is the upper end of the wick-cylinder, showing the channels for the wicks and the openings at the top of the cylinder for a portion of the heated air to pass to the outside of the wick-cylinder. Fig. 6 represents a downward top view of the lamp with the top of the cylinder $d$ cut off to the level of the ignition-point to better show the relative position of the concentric toothed rings $x\ x$ to the lamp-wicks and how they terminate and cap the two annular spaces from which hot air emerges. The interspaces between the different wick-sections are capped over to prevent the egress of any air at those points.

The lamps heretofore constructed employing the principle of returning the heated products of combustion by means of a central cylinder through the main shaft of the lamp have been confined to the use of gas or vapor as illuminants. Such lamps have openings at some point about the shaft of the lamp for the incoming draft, and the appliances and arrangements for preheating the air to support combustion are confined to or are a part of the shaft of the lamp. In the burning of oil in lamps where the flame is maintained by oil supplied by a wick, the wick contained in the shaft presents peculiar difficulties against such construction; hence in this invention the preheater and the apertures for the ingress of fresh air are located wholly apart and exterior to the lamp-shaft, and constitute a combination independent of it. Further, such lamps constructed on the principle above mentioned have in view the heating of the combustible material as well as the ingoing air, and they have been so arranged that the ingoing air passes up to the flame on the outside or exterior to the combustible material and exterior to the burner, the combustible material in its passage to the flame intervening between the ascending current of fresh air and the descending current of combustion products. In this invention the illuminant is to consist wholly of oil supplied by wicks, and the purpose is to prevent the heating of the illuminating material as much as practicable. Therefore the ingoing air intervenes between the central cylinder or tube and the ascending oil. With this view the construction is so devised that all the ingoing air, as it passes up the lamp-shaft, is held interior to and intervenes between the combustible and the outgoing combustion products, or at least such is the case until a portion of the inward draft is shunted off into the space $c$ near to the ignition-point. Instead of the central tube being surrounded by pipes or tubes that come in contact with it and with a cold-air chamber exterior to these, there is a free annular space about the central tube, to which all the incoming air is confined.

The following is a detailed description of the invention.

The object of my invention is to utilize the heat of combustion in an oil-lamp for preheating the air that sustains the flame, and thus greatly increase the luminosity of the flame in proportion to the amount of oil consumed.

The fresh air enters the top of the preheater O at a number of openings, one of which is shown at $a$, and passes down through the alternate divisions (marked $a\ a\ a$ in Fig. 2,) and then out at the bottom, through similar side openings, into the pipe $b$, and follows the course indicated by the arrows. When it reaches within one-half inch of the flame, it divides, a portion passing through the wick-cylinder (through openings in its top, as shown in Fig. 5) into the annular space c, and a portion ascending to the inside of the flame.

Surrounding the wick where the heated air has its exit, a little below and both interior and exterior to the circle of flame, there are arranged two concentric rings in the same plane, (indicated by x x.) These rings are supplied with fine teeth, through which the air passes before it impinges against the flame. These teeth cut the air into fine jets, better enabling it to penetrate the flame and facilitating the process of combustion. The teeth of both these rings are below the ignition-point of the wicks, and incline downward at an angle varying from thirty-five to forty degrees. This declination of the teeth is of great importance, as by this arrangement the jets of air are deflected toward the flame on both its sides, and strike it at an acute angle.

It will be observed that one of the rings is placed exterior to the wick and the other interior, the teeth on the inner ring projecting downward and outward, and those on the outer ring projecting downward and inward, so that the broadest part of the air-shafts issuing from the teeth strikes next to the flame. After the air encounters the flame of the lamp, the flame and the greater portion of the products of combustion are turned inward and downward, and the latter follows the exit-draft through the inclosed copper cylinder d until it comes back to the preheater, where it is broken up to pass through the alternate sections f f, as indicated in the drawings, and finally out of the chimney E. The partitions between the divisions in the preheater are of very thin copper, to which this part of the outgoing draft imparts its heat, which is taken up by the incoming air passing through the intermediate sections. A portion of the products of combustion finds its exit through the pipe S, that communicates between the top of the lamp-globe and the chimney E. Such portion as takes this course stimulates the downward draft through the tube d and round by the way of the preheater.

The wick material is of asbestos, and consists, as seen in Fig. 5, of five or more separate wicks, each inclosed in a casing by itself, and as the different wick-sections approach the top of the cylinder that bears them they are arranged at equal distances apart, about equal to the width of one of the wicks. The object of this is to give a free space between the wicks, where the openings that communicate between the interior of the cylinder and the annular hot-air space c can be made.

As the wicks are not designed to be movable, in order to shut down the light or to diminish its volume at any time, the upward flow of the oil is regulated by the throttle-ring g, which, on being tightened by the key n, compresses the wick and controls the supply. Surrounding the preheater is also a solid band-ring, h, which can be slipped up or down on the preheater-jacket over the entrance-holes for fresh air, and by this means the draft can be controlled or the light extinguished.

The top or flame mouth-piece K, that fits upon the copper pipe d, is made of refractory fire-clay. It has a convolvulus shape, and the material of which it is composed is thicker near the top than at the bottom of the tip, so that the greater bulk of material near the top radiates back its heat upon the flame and sustains the intensity of the heat where it is most desired that the flame shall be the brightest. Its larger top diameter, while assisting to spread the flame on the outside and give it a globular shape, also facilitates the turning of the flame over and into the mouth of the tip, and encourages the downward draft through the pipe d.

Outside of the annular hot-air space c is an annular jacket of asbestos, m, that serves as a non-conductor to protect the glass globe. The preheater is also surrounded by a jacket of asbestos felt, and those portions of the lamp-fittings marked r are asbestos, employed to prevent external heating. There is a packing of asbestos or other non conducting material inside of the wick-cylinder and intervening between the bend of the draft-pipes and the oil-reservoir, to prevent the heating of the oil below.

The advantages of this invention will be readily comprehended by those who are aware that the luminosity of a flame composed largely of carbon is almost proportional to its heat, and if the heat of such a flame burned by ordinary air is artificially increased the luminosity is greatly intensified, while the consumption of the supply material of the flame remains the same.

In this invention I do not broadly claim as novel the process of preheating the air that sustains an illuminating-flame by the heat of the flame itself. I am aware that this process has been employed and is now in vogue; but it has heretofore been confined to the burning of gas or vapors. Nor do I claim as novel the employing of a refractory fire-clay tip in connection with the flame, as such have for a long time been in use in the burning of gas.

I am also aware that serrated or toothed rings have been used in various ways in connection with illuminating-flames, and I do not claim their use as novel.

Having thus fully described my invention, what I do claim as new and useful, and desire to secure by Letters Patent, is—

1. In a hot-air oil-lamp, the preheater O, with its divisions, chambers, and its inward draft-apertures constructed exterior to the lamp-shaft, in combination with the connecting-pipes d and b, communicating with the lamp-flame, all substantially as set forth and illustrated.

2. In a hot-air oil-lamp, the lateral openings through the top of the cylinder that bears the wick, placed below the toothed rings and between the wick-channels on the cylinder, and communicating between the interior of said cylinder and the annular hot-air space $c$, as set forth, and for the purpose specified.

3. In a hot-air oil-lamp, the annular hot-air space $c$, constructed below and exterior to the ignition-points of the wicks, supplied with air from the cylinder interior to it by the communicating apertures, as shown and specified.

4. In a hot-air oil-lamp, the two toothed concentric rings $x\ x$, in combination with the termination of the annular hot-air-supply spaces, both placed in the same horizontal plane and having downward-sloping teeth which extend toward and encircle the wicks below their point of ignition, substantially as shown, and for the purpose specified.

5. In a hot-air oil-lamp, the throttle-ring $g$, made either to contract or open by the thumb-screw $n$, placed inside the shaft of the lamp, and encircling and bearing upon the wick, substantially as illustrated, and for the purpose set forth.

6. The combination of a central tube, $d$, inclosed by a much larger tube, $b$, with a free annular space between the two, constructed to begin at the top of the lamp-shaft interior to the frame, descending the shaft and terminating externally to it, in combination with the preheater O, in such manner that the tube $d$ communicates through the channels $f\ f\ f\ f$ with the chimney E, and the encircling tube $b$ communicates through the channels $a\ a\ a\ a$ with the internal openings in the preheater O, all substantially as shown, and for the purpose described.

7. In a hot-air oil-lamp, the combination of the external preheater, O, the connecting-pipe $d$, the inclosing connecting-pipe $b$, the communicating hot-air chamber $c$, the deflected toothed concentric rings $r\ r$, and the convolvulus-shaped flame mouth-piece $k$, arranged and operating in relation to one another as herein described with reference to the accompanying drawings.

CHARLES H. MURRAY.

Witnesses:
WILLIAM H. BIRTWHISTLE.
EDMUND O'CONNELL.